(12) United States Patent
Dimitri et al.

(10) Patent No.: US 7,162,329 B2
(45) Date of Patent: Jan. 9, 2007

(54) AUTOMATED DATA STORAGE SYSTEM INCLUDING A MOVEABLE RAIL SYSTEM AND GARAGE

(75) Inventors: Kamal Emile Dimitri, Tucson, AZ (US); John Edward Kulakowski, Tucson, AZ (US); Rodney Jerome Means, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/757,971

(22) Filed: Jan. 10, 2001

(65) Prior Publication Data

US 2002/0091464 A1     Jul. 11, 2002

(51) Int. Cl.
*G06F 7/00* (2006.01)

(52) U.S. Cl. .............. 700/214; 700/228; 414/277; 414/279; 104/48; 104/130.06; 104/137; 369/30.45; 369/30.57; 901/16

(58) Field of Classification Search .......... 414/277, 414/279, 280; 104/130.06, 48, 137, 163.1, 104/163.2; 360/92; 369/30.38, 30.39, 30.45, 369/30.57; 700/213–218, 228, 242; 901/16
See application file for complete search history.

(56) References Cited

U.S. PATENT DOCUMENTS

| | | | |
|---|---|---|---|
| 5,059,772 A * | 10/1991 | Younglove ............... 235/383 |
| 5,303,214 A | 4/1994 | Kulakowski et al. ....... 369/34 |
| 5,421,003 A | 5/1995 | Escola et al. ............. 395/575 |
| 5,471,561 A | 11/1995 | Cowgill et al. ............ 395/82 |
| 5,479,581 A | 12/1995 | Kleinschnitz ............. 395/82 |
| 5,504,873 A | 4/1996 | Martin et al. ............ 395/438 |
| 5,513,156 A | 4/1996 | Hanaoka et al. ........... 369/34 |
| 5,613,154 A | 3/1997 | Burke et al. ............. 395/821 |
| 5,914,919 A | 6/1999 | Fosler et al. ............. 369/34 |
| 5,940,243 A | 8/1999 | Kanetsuku et al. ......... 360/92 |
| 5,967,339 A | 10/1999 | Utsumi et al. .......... 211/41.12 |
| 6,022,180 A * | 2/2000 | Motoyama et al. ........ 414/277 |
| 6,097,566 A * | 8/2000 | Heller et al. ............. 360/92 |
| 6,123,029 A * | 9/2000 | Mobley ................. 105/4.1 |
| 6,129,027 A * | 10/2000 | Gauss et al. ............ 104/134 |
| 6,262,863 B1 * | 7/2001 | Ostwald et al. ........... 360/92 |
| 6,377,419 B1 * | 4/2002 | Beal et al. .............. 360/92 |
| 6,449,223 B1 * | 9/2002 | Kanetsuku et al. ...... 369/30.41 |

* cited by examiner

*Primary Examiner*—Patrick Mackey
*Assistant Examiner*—Jeffrey A. Shapiro
(74) *Attorney, Agent, or Firm*—Dale F. Regelman

(57) ABSTRACT

Applicants' automated data storage system includes a first media storage library having a first rail system, a garage having a movable rail system, said garage being disposed adjacent the media storage library, and a plurality of accessors movably disposed on either the first rail system or the movable rail system. In another embodiment, Applicants' automated data storage system further includes a second media storage library, having a second rail system, disposed adjacent the garage, such that the plurality of accessors is movably disposed on the first rail system, the second rail system, or the movable rail system. Applicants' invention further includes a method to move an accessor from the first media storage library into the garage, or from the first media storage library, through the garage, and into the second media storage library. Applicants' invention further includes a method to balance the workload of a plurality of data drives disposed within Applicants' automated data storage system.

22 Claims, 15 Drawing Sheets

AUTOMATED DATA STORAGE SYSTEM INCLUDING A MOVEABLE RAIL SYSTEM AND GARAGE

FIELD OF THE INVENTION

The present invention relates to an automated data storage system which includes at least one media storage library and an accessor garage facility having a movable rail system. The present invention further relates to a method to move accessors within Applicants' automated data storage system, i.e. from one or more of the libraries into the garage, from the garage into one or more of the media storage libraries, and between the media storage libraries. Applicants' invention further includes a method to balance workload within Applicants' automated data storage system.

BACKGROUND OF THE INVENTION

Automated media storage libraries are known for providing cost effective access to large quantities of stored media. Generally, media storage libraries include a large number of storage slots on which are stored portable data storage media. The typical portable data storage media is a tape cartridge, an optical cartridge, a disk cartridge, and the like. One (or more) accessor typically accesses the data storage media from the storage slots and delivers the accessed media to a data storage drive for reading and/or writing data on the accessed media. Suitable electronics both operate the accessor and operate the data storage drives to transmit and/or receive data from an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3494 Media Storage Library. Some of the automated media storage libraries have dual or multiple accessors to provide a level of redundancy, in that, one accessor is the "active" accessor and the other may take over the accessor function and be the active accessor.

In many conventional libraries, one of the accessors is always the active accessor, and the other(s) is always spare. For example, in a dual accessor automated media storage library, the active accessor conducts all of the operations to access and move the data storage media, and the other accessor is the spare and is moved out of the active operation area. In other conventional libraries, the accessors may share the active operation and no accessors are spare. Occasionally, an accessor may become unavailable, for example, if a component of the accessor must be replaced or repaired.

SUMMARY OF THE INVENTION

An automated data storage system is disclosed which includes one or more media storage libraries disposed adjacent to an accessor garage facility. The accessor garage includes one or more movable rail systems which can be stacked accordion-style within the garage. One or a plurality of spare accessors can be stored on the movable rail system(s) disposed within the garage. The individual movable rail systems disposed within the garage can be individually moved and thereby brought into alignment with the rail system(s) of the individual storage libraries such that accessors or movable media storage devices can be moved from the one or more of the libraries into the garage, or moved from the garage into one or more of the libraries, or moved from one library to another library.

For a fuller understanding of the present invention, reference should be made to the following detailed description taken in conjunction with the accompanying drawings.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
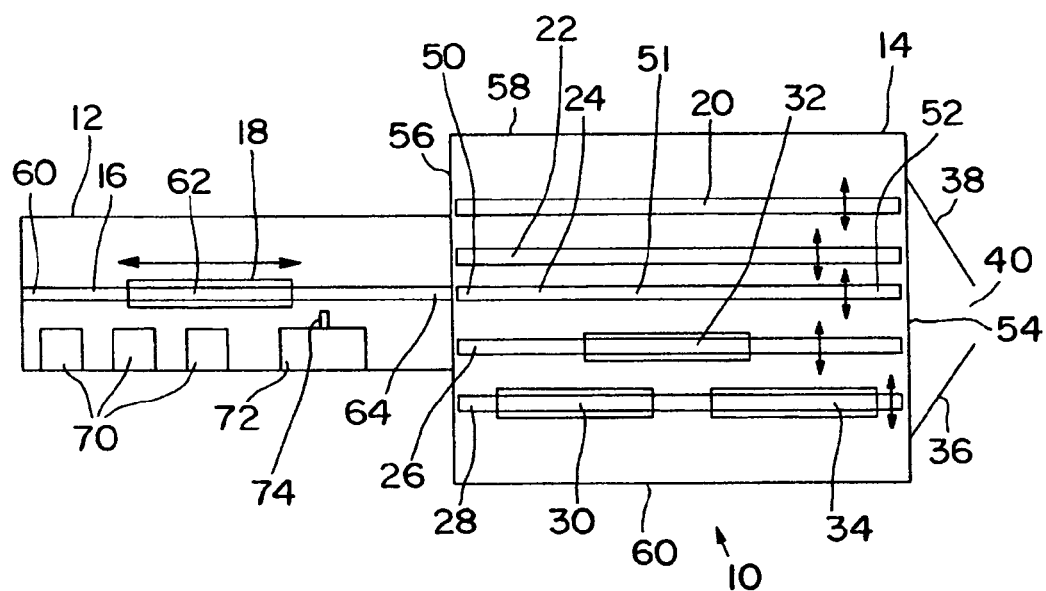
FIG. 1 is a top view of a first embodiment of Applicants' automated data storage system.
Figure 1:
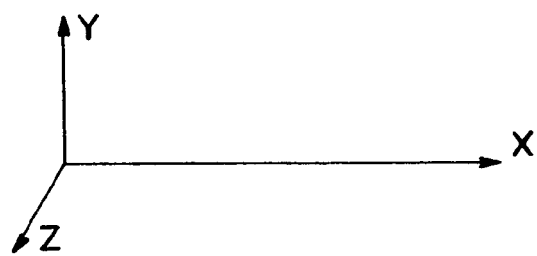

FIG. 1 shows information storage system 10. System 10 comprises media storage library 12 and garage 14. Media storage library 12 includes a plurality of media storage slots 70 in which are stored a plurality of portable data storage media. Media storage library 12 further includes one or a plurality of data storage drives, such as drive 72, for reading and/or writing data on accessed media 74. Media storage library 12 also includes first rail system 16. Accessor 18 is movably disposed on first rail system 16 such that accessor 18 can move bi-directionally along first rail 16. In the embodiment shown in FIG. 1, accessor 18 moves in the +/−X direction. The axes, i.e. X, Y, and Z, recited in Applicants' disclosure are shown for descriptive purposes only, and should not be construed as limiting.

Figure 2:
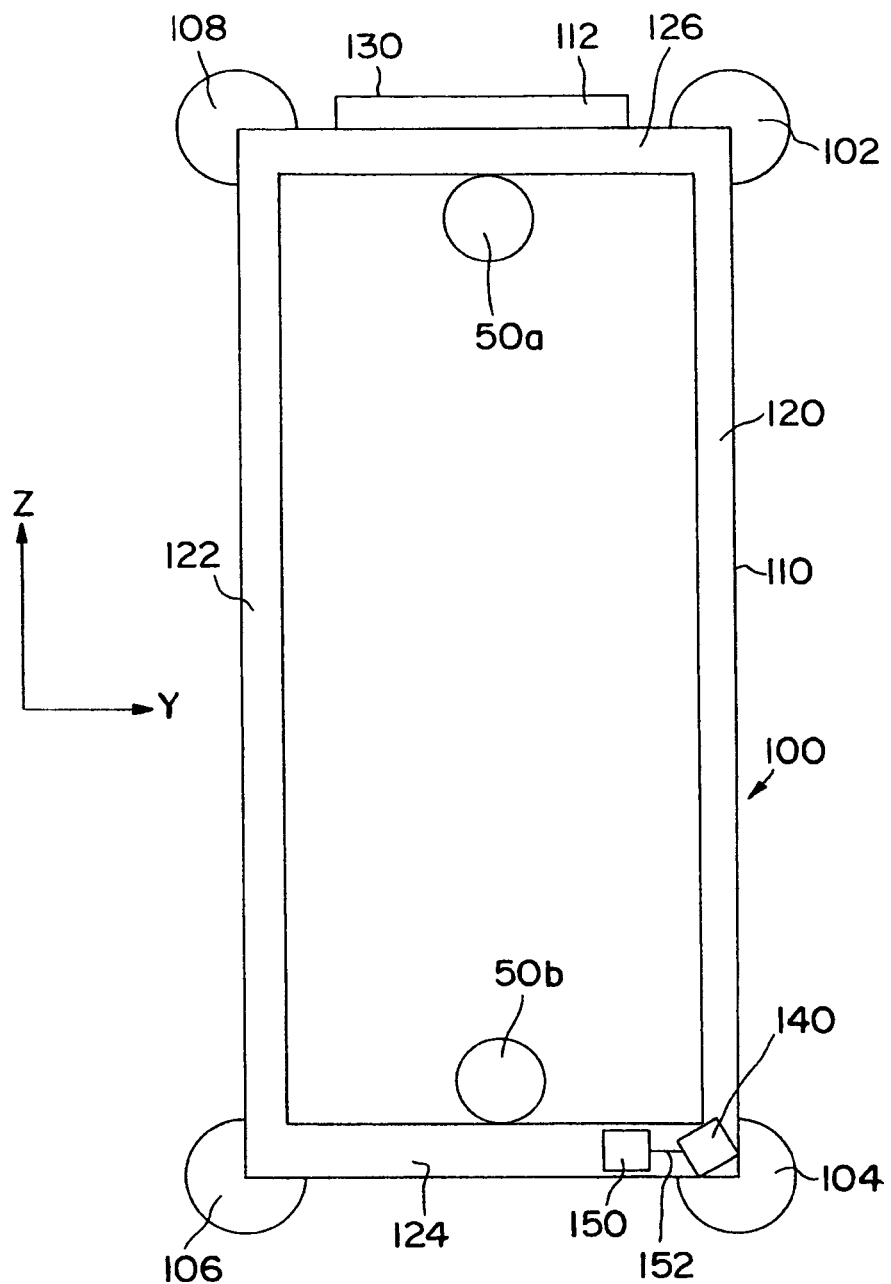
FIG. 2 is an end view of Applicants' positioning apparatus.

U.S. Pat. No. 5,914,919 describes the construction and operation of accessors such as accessor 18, and is hereby incorporated herein by reference. FIG. 2 of the '919 patent shows a set of parallel rails as numeral 22. In a preferred embodiment of Applicants' invention, first rail system 16 includes two parallel upper and lower rails.

First rail system 16 has distal end portion 60 and proximal end portion 64 connected by central portion 62. In the embodiment shown in FIG. 1, distal end portion 60, central portion 62, and proximal end portion 64 are parallel and coaxial. By coaxial, Applicants mean that distal end portion 60, central portion 62, and proximal end portion 64 have a common axis in the +/−X direction. In other embodiments of Applicants' invention, distal end portion 60, central portion 62, and proximal end portion 64 are parallel but not coaxial. In still other embodiments, distal end portion 60, central portion 62, and proximal end portion 64 are neither parallel nor coaxial.

Garage 14 includes one or a plurality of movable rail systems. Each movable rail system of garage 14 can hold one or a plurality of accessors. In the embodiment shown in FIG. 1, rail systems 20, 22, 24, 26, and 28 are individually movable in the +/−Y direction, which is substantially perpendicular to the +/−X direction. By substantially perpendicular, Applicants mean that the X direction and the Y direction define an angle of about 90°, plus or minus about 10°.

Figure 5A:
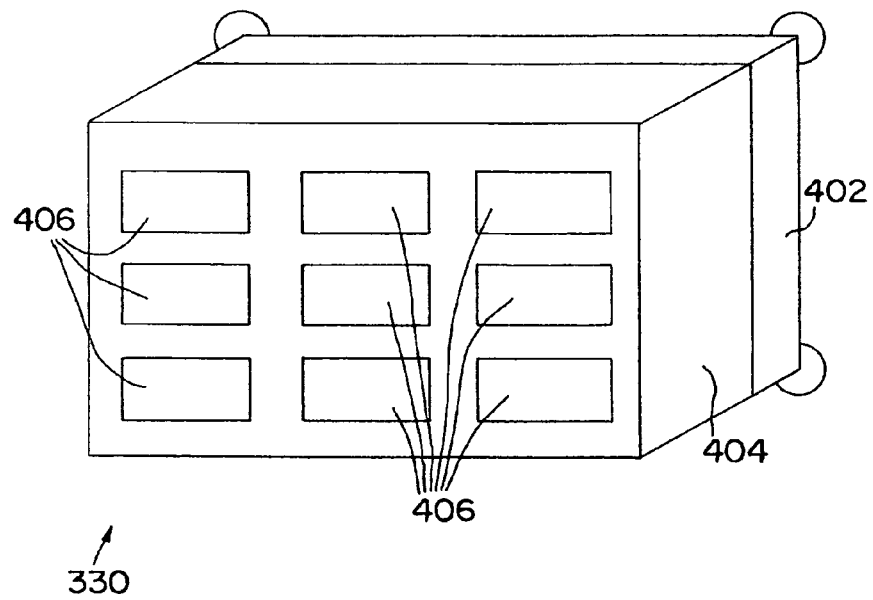
FIG. 5a is a perspective view of a movable media storage device.
Figure 5B:
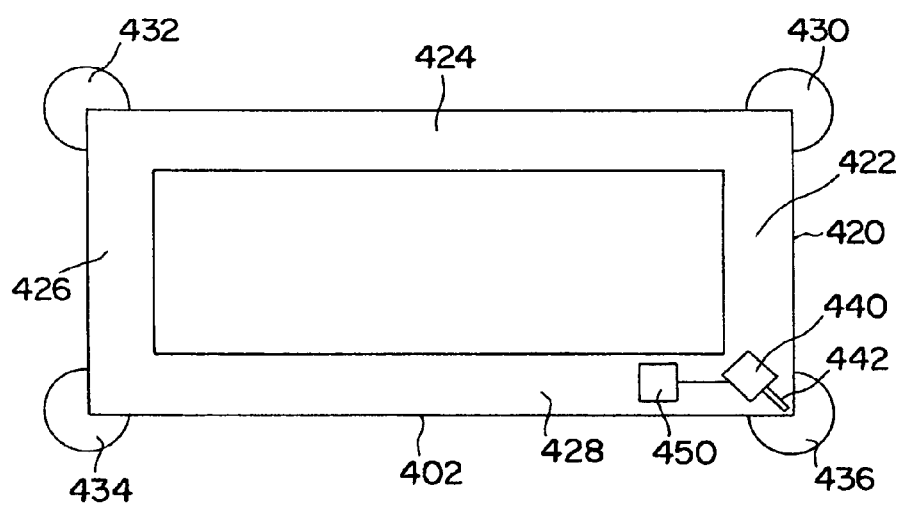
FIG. 5b is a top view of the frame portion of Applicants' movable storage device.

In the embodiment shown in FIG. 1, accessors 30 and 34 are movably disposed on movable rail system 28. Accessors 30 and 34 move along rail system 28 in the +/−X direction. Accessor 32 is movably disposed on movable rail system 26. In an alternative embodiment discussed below, one or more of devices 30, 32, and 34, can comprise a movable media storage device. Such a movable media storage device is shown in FIGS. 5a and 5b, and is discussed and described below.

The movement of the various accessors in Applicants' automated data storage system is controlled by one or a plurality of controllers. The '919 patent describes such controllers. In Applicants' invention, the one or a plurality of controllers communicate with each of the individual accessors by wireless communication. In a preferred embodiment, such wireless communication utilizes one or more frequencies between about 800 MHz and about 1 GHz.

Garage 14 also includes one or more doors. In the embodiment shown in FIG. 1, access port 40 comprises first door 36 and second door 38, both of which are disposed on side 54 of garage 14. Accessors disposed on the movable rails located in garage 14 can be removed via access port 40. Accessors may be removed for any number of reasons, including routine maintenance, repair, and/or modification. Additional accessors and/or serviced/repaired/modified accessors can be placed into service in the data storage system by installing those units onto one of the movable rail systems disposed in garage 14 via access port 40.

By proper alignment of rail systems disposed in library 12 and garage 14, accessors can move between media storage library 12 and garage 14. For example as shown in FIG. 1, movable rail system 24 comprises first end 50, central portion 51, and second end 52. Movable rail system 24 can be positioned such that first end 50 is substantially colinear with proximal end 64 of rail system 16. By substantially colinear Applicants mean that first end 50 is aligned with proximal end 64 such that accessor 18 can move bi-directionally between rail system 16 and movable rail system 24. Applicants' invention includes a method wherein accessors in library 12 move into garage 14, and wherein accessors stored in garage 14 move into library 12.

Because the movable rail system of garage 14 move in the XY plane, a plurality of accessors can be stored in garage 14. For example as shown in FIG. 1, accessors 30 and 34 are stored on movable rail system 28. In the event an accessor needs maintenance, repair, or modification, that accessor can be moved from media library 12 into garage 14, and subsequently removed via access port 40 for repair. That removed accessor can be replaced by an accessor stored in garage 14.

Movable rail systems 20, 22, 24, 26, and 28 are not designed to pass one another in garage 14. Rather, the individual movable rail systems disposed in garage 14 stack accordion-style adjacent side 58 or side 60, or both, of garage 14. In a preferred embodiment of Applicants' method, a malfunctioning accessor is moved to one of the outermost movable rail systems, i.e. 20 or 28, while spare operational accessors are stored on rail systems 22, 24, and 26.

Movable rail system 24 has first end 50 which is disposed adjacent side 56 of garage 14, and second end 52 which is disposed adjacent side 54 of garage 14. In a preferred embodiment shown in FIG. 7, movable rail system 24 comprises parallel rails 24a and 24b. Upper rail 24a includes first end 50a, central portion 51a, and second end 52a. Similarly, lower rail 24b includes first end 50b, central portion 51b, and second end 52b.

Rails 24a and 24b can be formed from any rigid material, including but not limited to extruded and/or machined metals, extruded and/or molded polymeric materials, and mixtures of same. In a preferred embodiment, rails 24a and 24b are circular in cross section. In other embodiments, rails 24a and 24b can be square, oval, I-shaped, or rectangular, in cross section. Rails 24a and 24b are preferably formed from Stainless Steel Type-302, are circular in cross-section, and have a diameter of between about 0.25 inches and about 2.0 inches, most preferably between about 0.5 inches to about 1.0 inch.

First positioning apparatus 100 is disposed around first ends 50a and 50b. First positioning apparatus 100 is movably disposed on rail system 80. In a preferred embodiment, rail system 80 includes two parallel rails, namely upper rail 80a and lower rail 80b. Rail system 80 is disposed on wall 56 (FIG. 1) of garage 14 (FIG. 1). First positioning apparatus 100 includes at least one powered roller in contact with rail system 80.

Second positioning apparatus 120 is disposed around second ends 52a and 52b. Second positioning apparatus 120 is movably disposed on rail system 85. In a preferred embodiment, rail system 85 includes two parallel rails, namely upper rail 85a and lower rail 85b. Rail system 85 is disposed on wall 54 (FIG. 1) of garage 14 (FIG. 1). Second positioning apparatus 120 includes at least one powered roller in contact with rail system 85.

Figure 7:
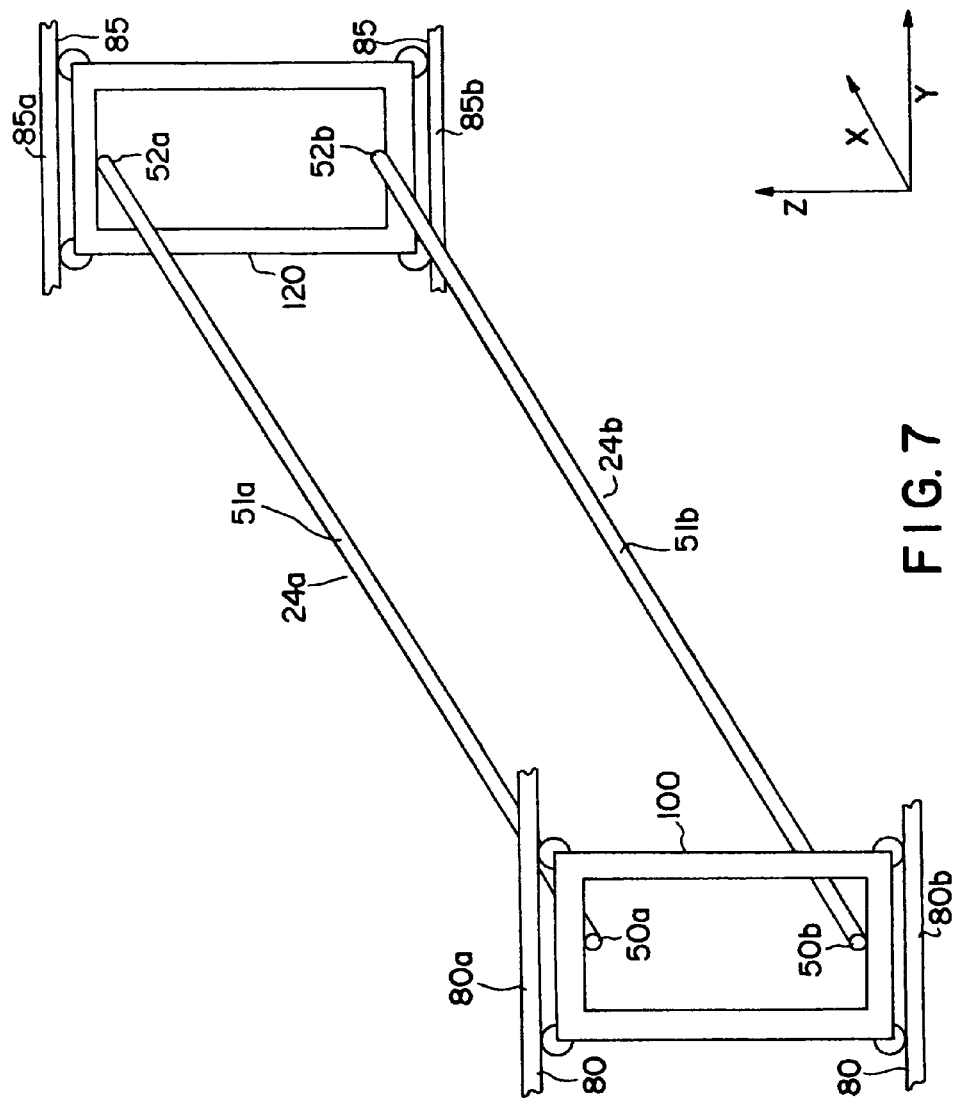
FIG. 7 is a perspective view showing one embodiment of Applicants' movable rail system.

Referring to FIG. 1, movable rail system 24 moves within garage 14 in the +/−Y direction. Referring to FIGS. 1 and 7, by coordinating the rotation of the powered rollers disposed on positioning apparatus 100 (FIG. 7) and on positioning apparatus 120 (FIG. 7), movable rail system 24 can move along sides 54 (FIG. 1) and 56 (FIG. 1) of garage 14 (FIG. 1).

Referring now to FIG. 2, positioning apparatus 100 is shown in greater detail. Positioning apparatus 100 and positioning apparatus 120 (FIG. 7) include the same components, and function similarly, therefore, the description of positioning apparatus 100 also applies to positioning apparatus 120. Positioning apparatus 100 is disposed around first end 50a and around first end 50b. Positioning apparatus 100 includes frame 110, rollers 102, 104, 106, and 108, and linear encoder 112.

Frame 110 is formed from any rigid material, including metal, plastic, and combinations thereof. In a preferred embodiment, frame 110 is formed from Stainless Steel Type-302. Frame 110 can be integrally formed by casting, milling, or stamping. Alternatively, frame 110 can be formed from member 120, member 122, member 124, and member 126. These individual members can be joined by conventional methods, including welding, adhesive bonding, mechanical attachments such as screws, nuts/bolts, and the like, and combinations thereof.

Rollers 102, 104, 106, and 108, are rotatably disposed on the four corners of frame 110. Rollers 102, 104, 106, and 108 are formed from semi-rigid or rigid materials, such as metal, rubber, plastic, wood, and combinations thereof. Rollers 102, 104, 106, and 108, are preferably formed of Stainless Steel Type-302, and have a diameter of between about 1.0 inch and about 4.0 inches, most preferably between about 1.5 inches and about 2.5 inches.

Motor 140 is connected to and rotates wheel 104. Rotation of the wheel 104 in a first direction will cause positioning apparatus 100 to move in the +Y direction, while rotation in the second, i.e. opposite, direction will cause apparatus 100 to move in the −Y direction. Wireless receiver 150 is connected to motor 140 by cable 152. Receiver 150 receives first information, such as movement commands, from one or a plurality of controllers by wireless communication. The one or a plurality of controllers may be located within, or in the alternative located external to, Applicants' automated data storage system. Receiver 150 receives first information from the one or a plurality of controllers on frequencies between about 800 MHZ and about 1 GHz.

Linear encoder 112 is attached to member 126, and distal end 130 extends outwardly therefrom. Linear encoder 112 is disposed on member 126 below the XY plane described by wheels 102 and 108. Linear encoder 112 comprises a pointer or a blade-type structure, and is used to ascertain the position of frame 110 and thus rails 50a and 50b using linear encoder reader 500 (FIG. 6).

Figure 6:
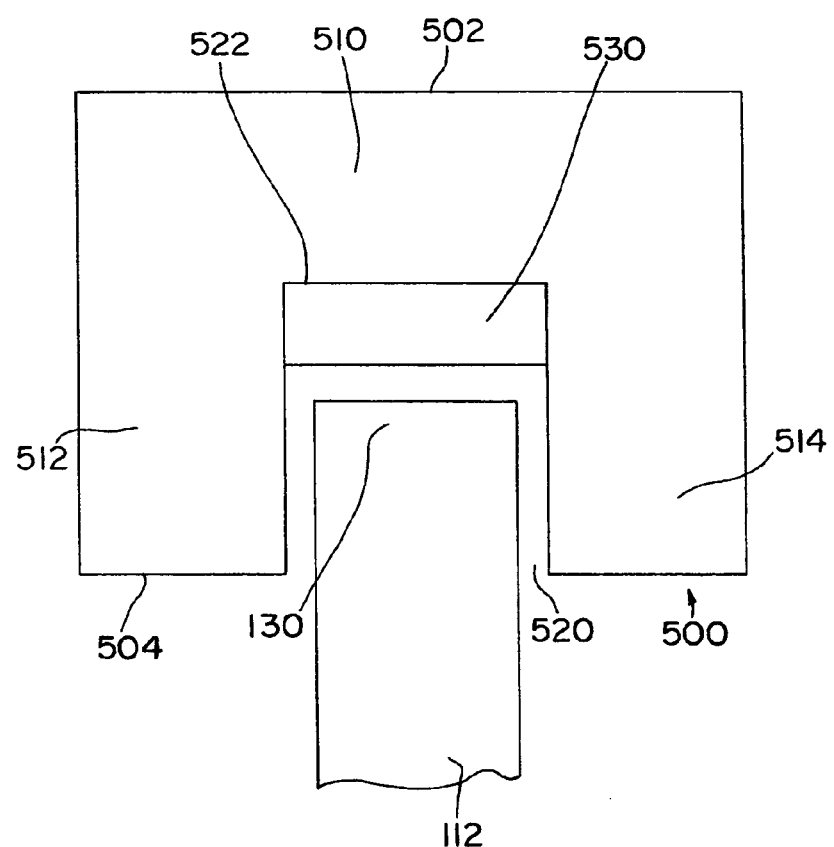
FIG. 6 is a side view of Applicants' stationery linear encoder reader showing the relationship between that stationery linear encoder reader and a movable linear encoder disposed on each of Applicants' positioning devices.

Referring now to FIG. 6, stationery linear encoder reader 500 is shown in relationship to movable linear encoder 112. Linear encoder reader 500 comprises a U-shaped member with closed end 502 opposite open end 504. Linear encoder reader 500 includes first arm 512, second arm 514, and central portion 510. Linear encoder reader 500 can be formed from any rigid material including metal, plastic, and combinations thereof. Sensing strip 530 is disposed on distal side 522 of central portion 510 such that sensing strip 530 faces outwardly toward open end 504.

Referring again to FIG. 1, first arm 512 of U-shaped linear encoder reader 500 is mounted on side 54 of garage 14 parallel to the Y axis, such that open end 504 faces downwardly, and such that linear encoder reader 500 extends from side 60 to side 58. As movable rail system 24, for example, moves in the +Y direction toward side 58, linear encoder 112 (FIG. 2) travels inside slot 520 in near proximity to sensing strip 530.

Sensing strip 530 transmits second information to the aforementioned one or a plurality of controllers. Such second information includes the position of movable rail system 24. Sensing strip 530 determines the position of movable rail system 24 by monitoring the position of linear encoder 112.

In one embodiment, sensing strip 530 monitors the position of linear encoder 112 using optical sensing means, wherein distal end 130 of encoder 112 comprises, for example, an LED. In another embodiment, sensing strip 530 monitors the position of encoder 112 using a magnetic sensing means, wherein distal end 130 of encoder 112 comprises a magnet. In yet another embodiment, sensing strip 530 monitors the position of encoder 112 by electric field sensing means, wherein distal end 130 of encoder 112 emits a weak electric field.

Movable rail systems 20, 22, 24, 26, and 28 are formed identically. Therefore, each of these movable rail systems includes a first positioning apparatus disposed on a first end and a second positioning apparatus disposed on the second end. By coordinating the rotation of the powered rollers disposed on the opposing ends, each of the movable rail systems disposed within garage 14 can be moved along sides 54 and 56 of garage 14.

Figure 3:
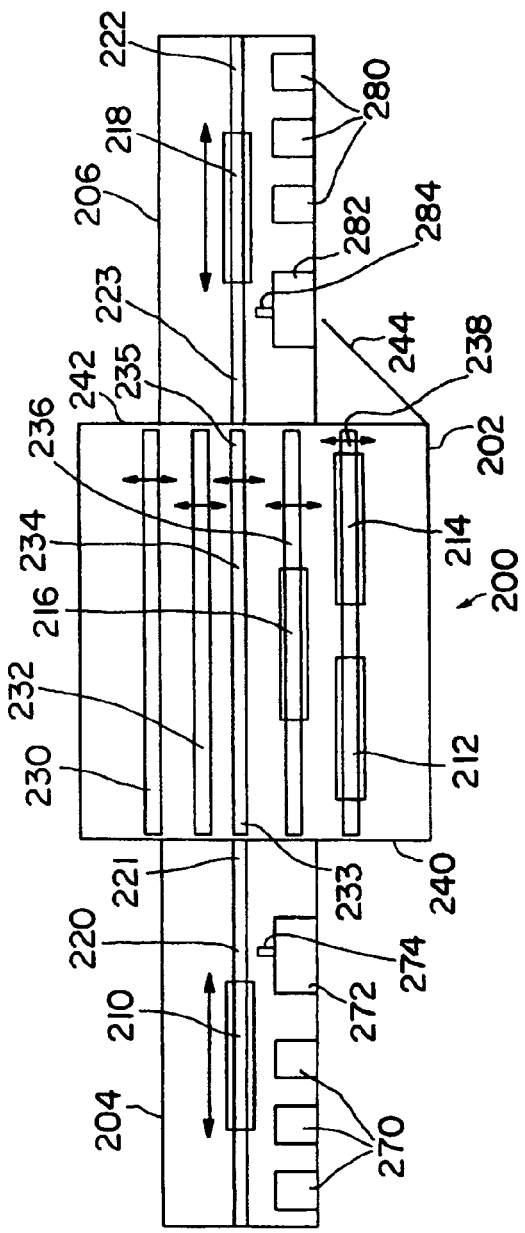
FIG. 3 is a top view of a second embodiment of Applicants' automated data storage system.

Referring now to FIG. 3, data storage system 200 is shown. Data storage system 200 includes garage 202, first media storage library 204, and second media storage library 206. Media storage library 204 includes a plurality of media storage slots 270 in which are stored a plurality of portable data storage media. Media storage library 204 further includes one or a plurality of data storage drives, such as drive 272, for reading and/or writing data on accessed media 274. Media storage library 206 includes a plurality of media storage slots 280 in which are stored a plurality of portable data storage media. Media storage library 206 further includes one or a plurality of data storage drives, such as drive 282, for reading and/or writing data on accessed media 284.

Garage 202 includes movable rail systems 230, 232, 234, 236, and 238. Movable rail systems 230, 232, 234, 236, and 238, each include on their respective two ends a positioning apparatus as shown in FIG. 2 and described above. Thus, movable rail systems 230, 232, 234, 236, and 238 are each independently movable in the +/−Y direction. Garage 202 also includes door 244 which allows access to accessors disposed on movable rail systems 236 and 238. Although the embodiment shown in FIG. 3 includes a single door, other embodiments of Applicants' garage 202 include a plurality of doors.

Media storage library 204 is disposed adjacent side 240 of garage 202. Media storage library 204 comprises rail system 220. In a preferred embodiment, rail system 220 includes two parallel rails, which include an upper rail and a lower rail. Accessor 210 is movably disposed on rail system 220. Proximal end 221 of rail system 220 is disposed adjacent side 240 of garage 202.

Media storage library 206 is disposed adjacent side 242 of garage 202. Media storage library 206 comprises rail system 222. In a preferred embodiment, rail system 222 includes two parallel rails, which include an upper rail and a lower rail. Accessor 218 is movably disposed on rail system 222. Proximal end 223 of rail system 222 is disposed adjacent side 242 of garage 202.

As shown in FIG. 3, proximal end 221 of rail system 220 and proximal end 223 of rail system 222 are coaxial. By coaxial, Applicants mean that proximal end 221 and proximal end 223 share a common axis in the X direction. Movable rail system 234 has first end 233 and second end 235. Movable rail system 234 can be vertically positioned such that first end 233 is substantially colinear with proximal end 223, and second end 235 is substantially colinear with proximal end 221. By substantially colinear, Applicants mean that accessor 218 can move between rail system 222 and rail system 234, and accessor 210 can move between rail system 220 and movable rail system 234. In the pass-through configuration shown in FIG. 3, accessor 210 and/or accessor 218 can move from one media storage library, pass through garage 202, and enter the second media storage library without stopping.

In the embodiment shown in FIG. 3, accessors 212, 214, and 216, are stored in garage 202 for use as needed. In the alternative, accessors 212, 214, and 216 can be removed from garage 202 via door 244 for routine service, repair, and/or modification. Although FIG. 3 shows a single door, i.e. door 244, disposed on garage 202, Applicants' invention includes embodiments wherein additional access doors are disposed on garage 202 thereby allowing ready access to all the accessors stored therein.

In an alternative embodiment discussed below, one or more of devices 212, 214, and 216, can comprise a movable media storage device. Such a movable media storage device is shown in FIGS. 5a and 5b, and is discussed and described below.

Figure 4:
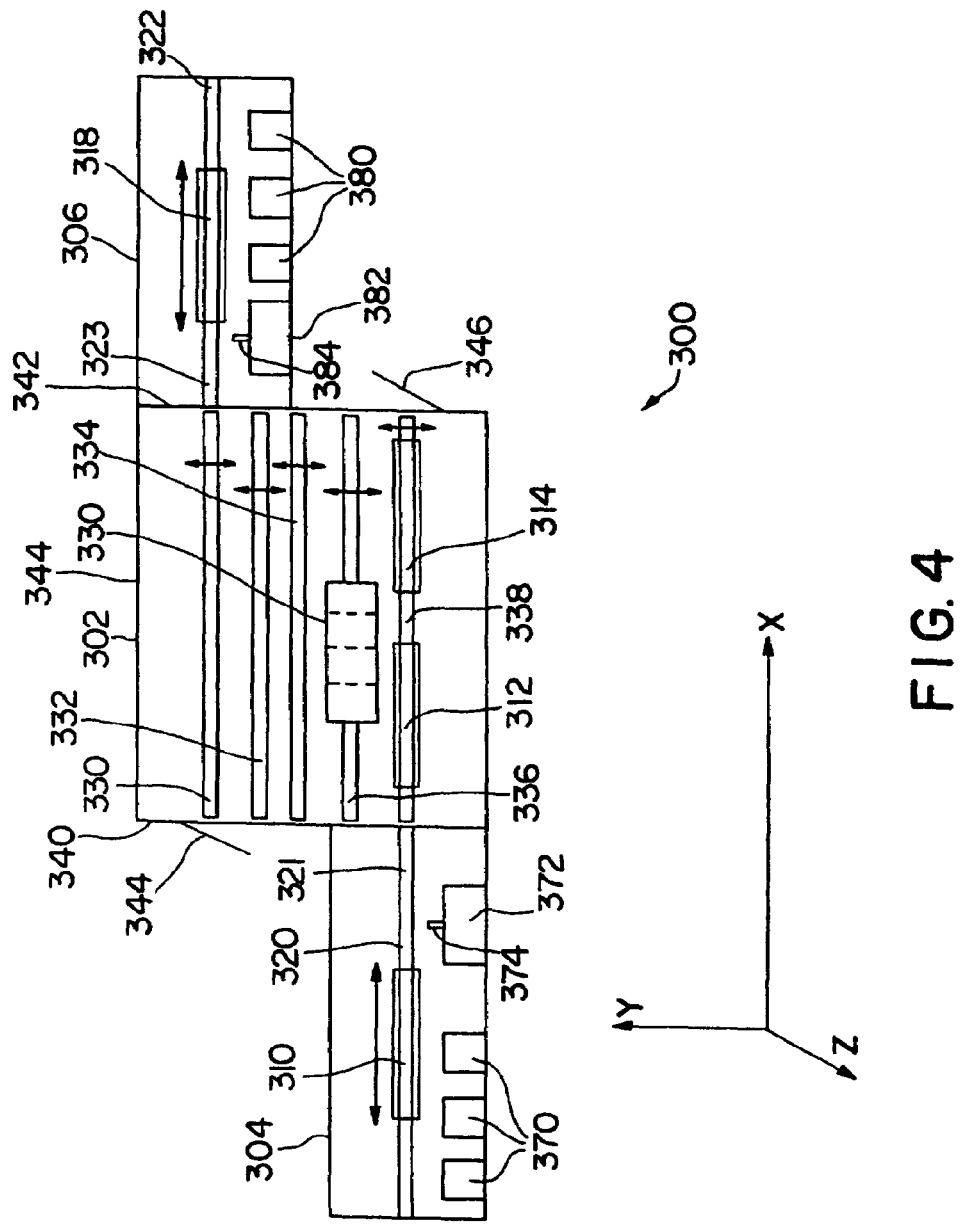
FIG. 4 is a top view of a third embodiment of Applicants' automated data storage system.

Referring now to FIG. 4, data storage system 300 is shown. Data storage system 300 includes garage 302, first media storage library 304, and second media storage library 306. Media storage library 304 includes a plurality of media storage slots 370 in which are stored a plurality of portable data storage media. Media storage library 304 further includes one or a plurality of data storage drives, such as drive 372, for reading and/or writing data on accessed media 374. Media storage library 306 includes a plurality of media storage slots 380 in which are stored a plurality of portable data storage media. Media storage library 306 further includes one or a plurality of data storage drives, such as drive 382, for reading and/or writing data on accessed media 384.

Garage 302 comprises movable rail systems 330, 332, 334, 336, and 338. Movable rail systems 330, 332, 334, 336, and 338, each include on their respective ends a positioning apparatus as shown in FIG. 2 and described above. Thus, movable rail systems 330, 332, 334, 336, and 338 are each independently movable in the +/−Y direction. Garage 302 also includes access doors 344 and 346 which allow access to accessors disposed on movable rail systems 330, 332, 334, and 334, 336, 338, respectively.

Media storage library 304 is disposed adjacent to side 340 of garage 302. Media storage library 304 comprises rail system 320 having proximal end 321 disposed adjacent side 340 of garage 302. Accessor 310 is movably disposed on rail system 320. In a preferred embodiment, rail system 320 includes two parallel rails, which include an upper rail and a lower rail. Media storage library 306 is disposed adjacent to side 342 of garage 302. Media storage library 306 comprises rail system 322 having proximal end 323 disposed adjacent side 342 of garage 302. Accessor 318 is movably disposed on rail system 322. In a preferred embodiment, rail system 322 includes two parallel rails, which include an upper rail and a lower rail.

In the embodiment shown in FIG. 4, proximal end 321 of rail system 220 and proximal end 323 of rail system 222 are parallel but not coaxial. This being the case, the movable rail systems disposed in garage 302 cannot be positioned to be simultaneously colinear with both proximal end 321 and proximal end 323. In the embodiment shown in FIG. 4 rail system 320, including proximal end 321, is parallel to rail system 322, including proximal end 323. In other embodiments of Applicants' invention, portions of rail system 320, other than proximal end 321, and portions of rail system 322, other than proximal end 323, are neither parallel nor coaxial.

As shown in FIG. 4, movable rail system 330 is positioned to be substantially colinear with rail system 322. By substantially colinear, Applicants mean that accessor 318 can move between rail systems 322 and 330. In this substantially colinear configuration, accessor 318 can be moved from media library 306 into garage 302.

Movable rail system 330 can be moved to a position adjacent side 344, and then movable rail system 332 can moved and positioned adjacent movable rail system 330. Movable rail system 334 can then be positioned to be substantially colinear with rail system 322. In this substantially colinear configuration, accessor 318 can move into garage 302 from library 306 by moving from rail system 318 onto rail system 334. Movable rail system 334 can then be positioned to be substantially colinear with rail system 320. In this substantially colinear configuration accessor 318 can move from garage 302 into first media library 304 by moving from rail system 344 onto rail system 320.

Similarly, accessor 310 can move from first media library 304 to second media library 306 by positioning a movable rail system disposed in garage 302 to be substantially colinear with rail system 320, moving accessor 310 onto that movable rail system, positioning that movable rail system to be substantially colinear with rail system 322, and moving accessor onto rail system 322.

Referring again to FIG. 4, this embodiment of Applicants' automated data storage system includes movable media storage device 330. Movable media storage device 330 is movably disposed on rail system 336.

Referring now to FIG. 5a, movable media storage device 330 includes media storage unit 404 mounted on base 402. Media storage unit 404 includes a plurality of media storage slots 406 disposed therein. Referring to FIG. 5b, base 402 includes frame 420. Frame 420 can comprise an integral unit formed, for example, by casting, milling, or stamping metal or plastic. In the alternative, frame 420 can be formed from first side member 422, second side member 424, third side member 426, and fourth side member 428. These individual members can be joined using conventional methods, including welding, adhesive bonding, mechanical attachment, and the like.

Wheels 430, 432, 434, and 436 are each pivotably mounted on one of the four corners of frame 422 such that those wheels extend outwardly from frame 422. Motor 440 is disposed on frame 422. External shaft 442 extends outwardly from motor 440 and engages wheel 436. Rotation of motor 440 in a first direction causes movable media storage device 330 to move in a first direction along movable rail system 336 (FIG. 4) in a first direction. Rotation of motor 440 in a second, i.e. opposite, direction, causes movable media storage device 330 to move in a second, i.e. opposite, direction along movable rail system 336.

Movable media storage device 330 can have any length equal to, or shorter than, the length of the rail system on which it is disposed. Referring to FIG. 4, movable media storage device 330 can be as long as rail system 336. In other embodiments, movable media storage device 330 has a length less than the length of rail system 336.

FIG. 4 shows a single movable media storage device, i.e. device 330, disposed within garage 302. Additional movable media storage devices can be installed in garage 302 through door 346. Thus in other embodiments of Applicants' invention, a plurality of movable media storage devices are movably disposed on the movable rail systems disposed in garage 302.

Figure 8:
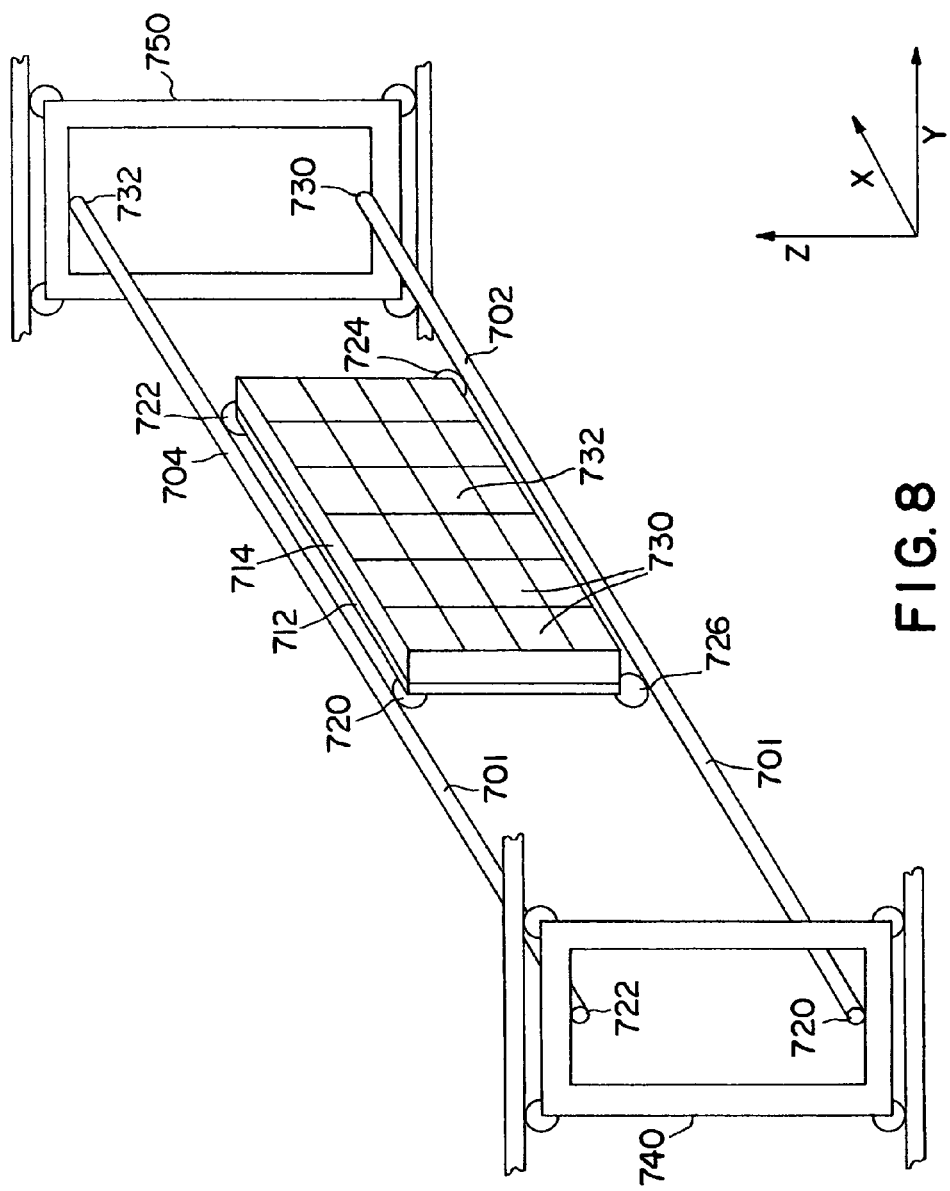
FIG. 8 is a perspective view showing Applicants' movable media storage device movably disposed on a movable rail system.

Referring to FIG. 8, movable media storage device 730 is shown movably disposed on movable rail system 701.

Movable rail system 701 includes lower rail 702 and upper rail 704. Lower rail 702 includes first end 720 and second end 730. Upper rail 704 includes first end 722 and second end 732. Movable rail system further includes first positioning apparatus 740 disposed around first ends 720 and 722 and second positioning apparatus 750 disposed around second ends 730 and 732. First positioning apparatus 740 and second positioning apparatus 750 are formed as shown in FIG. 2 and as described above in conjunction with positioning apparatus 100.

Movable media storage device 730 is formed from movable frame 712 and media storage unit 714. Media storage unit 714 includes a plurality of storage slots 732. Movable frame 712 includes wheels 720, 722, 724, and 726. At least one of wheels 720, 722, 724, and 726 is powered.

Figure 9A:
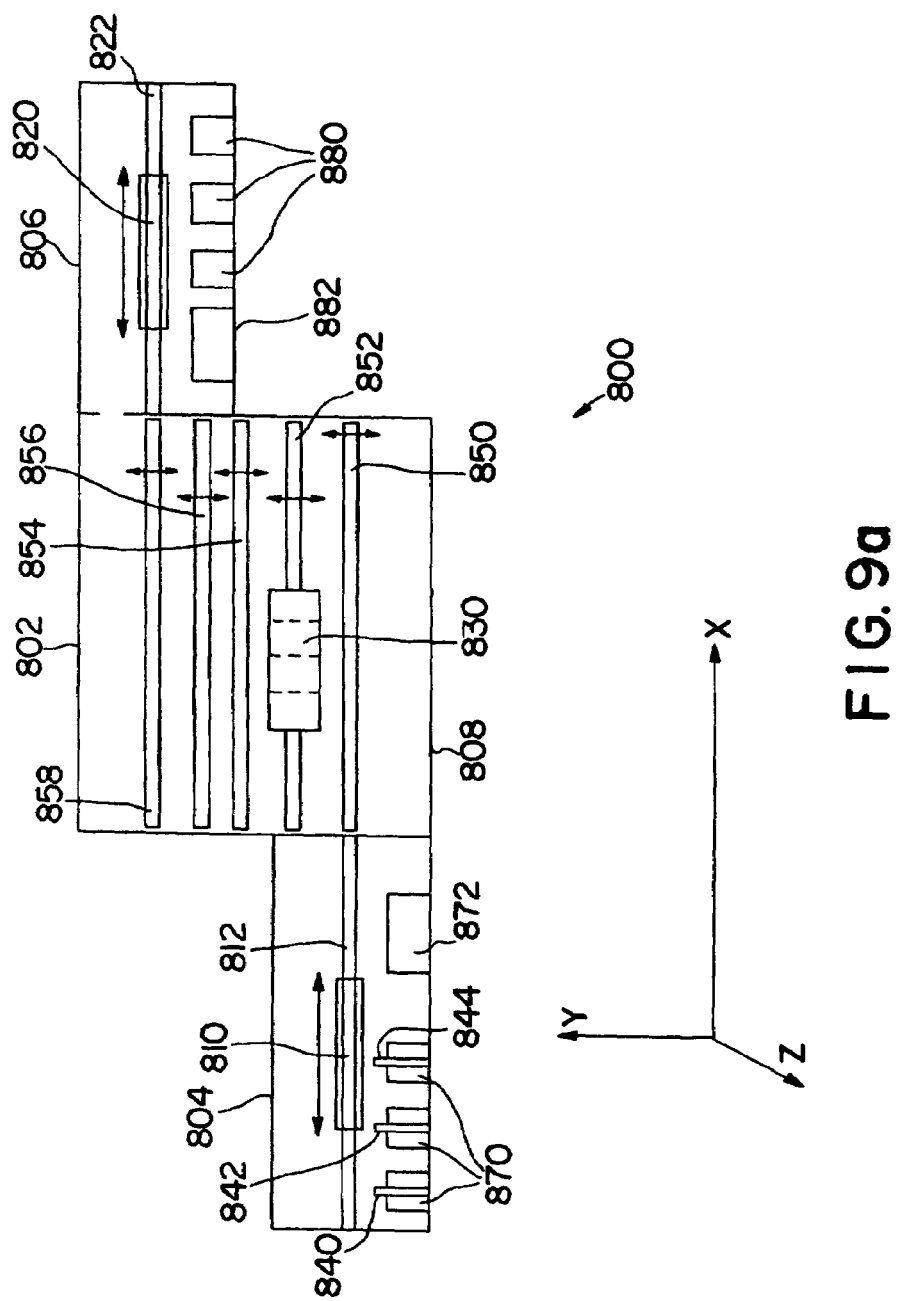
FIG. 9a is a top view of one embodiment of Applicants' automated data storage system which includes a movable media storage device.

Applicants' invention includes a method to balance work load within an automated data storage system, wherein that method utilizes one or more movable media storage devices. Applicants' method is shown in FIGS. 9a through 9f. Referring to FIG. 9a, automated data storage system 800 comprises library 804 which includes a plurality of storage slots 870, data drive 872, and rail system 812; library 806 which includes a plurality of storage slots 880, data drive 882, and rail system 822; garage 802 which includes movable rail systems 850, 852, 854, 856, and 858; movable media storage device 830 movably disposed on movable rail system 852; accessor 810 movably disposed on rail system 812; and accessor 820 movably disposed on rail system 822.

In the event drive 872 is used much more frequently than is drive 882, frequently used portable data storage cartridges 840 and 842 can be moved from library 804 to near proximity to library 806 using movable media storage device 830. Because portable data storage cartridges 840 and 842 are now located in near proximity to drive 842, those cartridges are subsequently delivered to drive 882 rather than to drive 872 thereby balancing the workloads of drives 872 and 882.

Figure 9B:
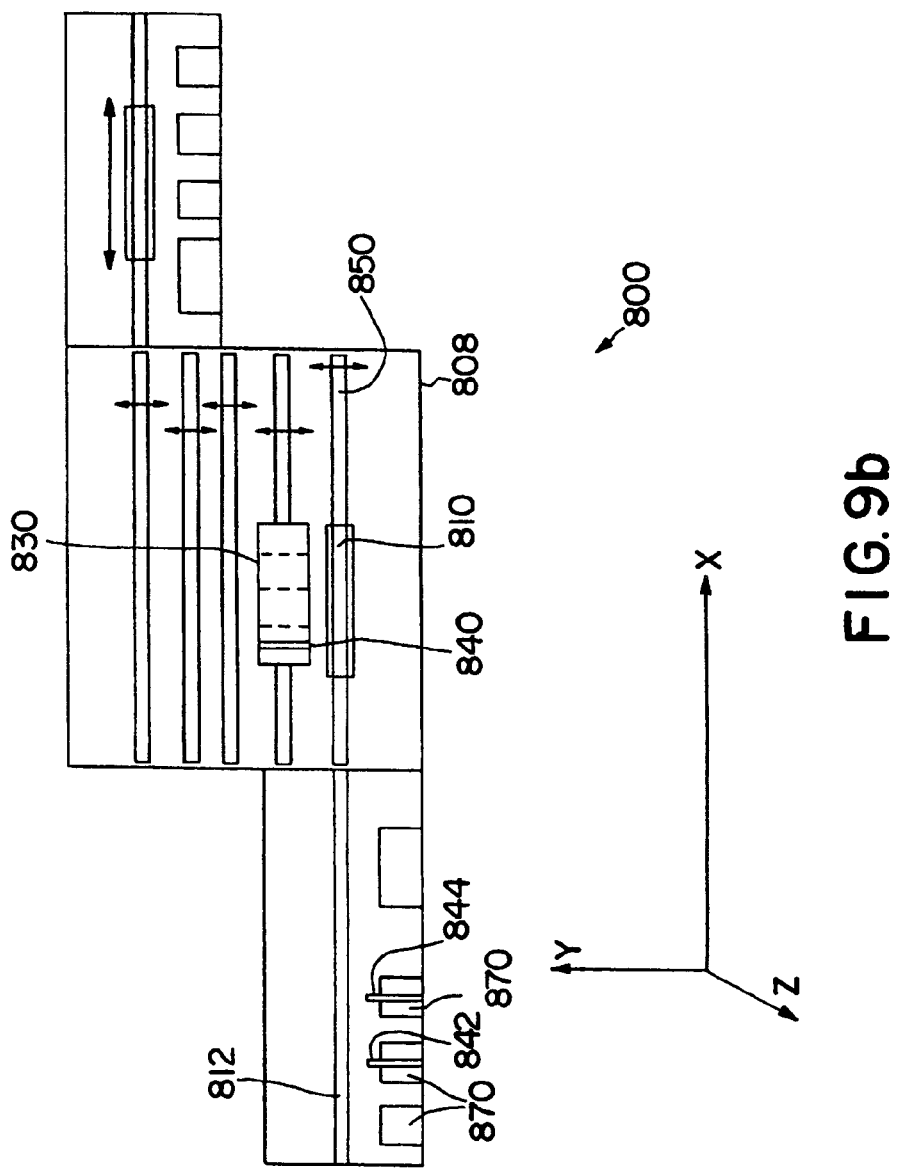
FIG. 9b shows a first step in Applicants' method to balance work load in an automated data storage system.
Figure 9C:
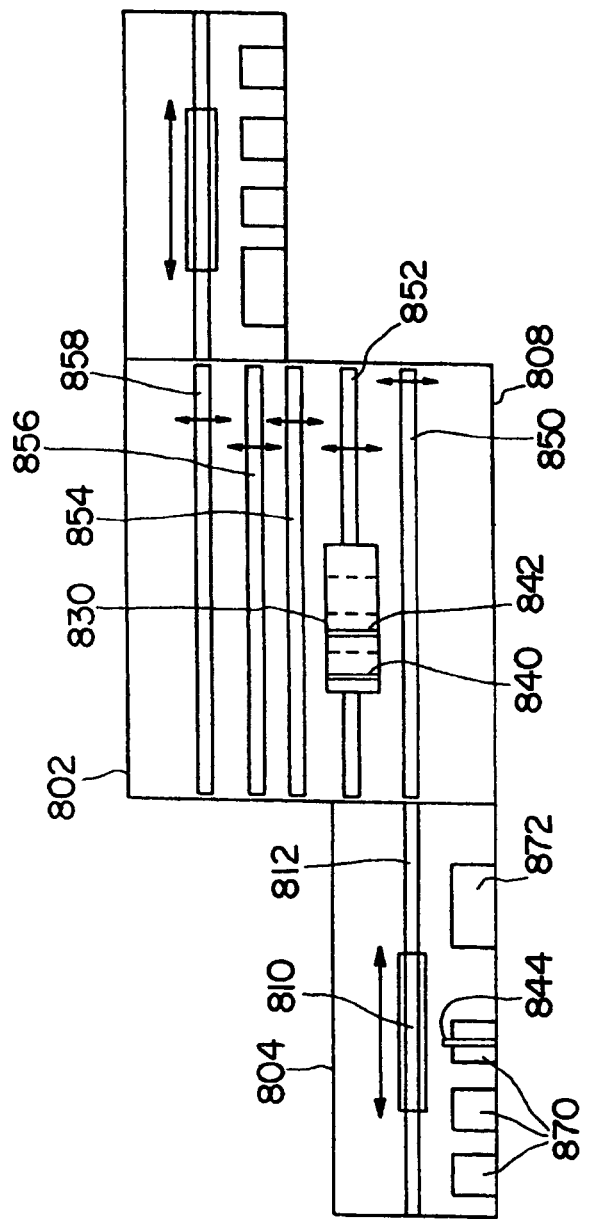
FIG. 9c shows a second step in Applicants' method to balance work load in an automated data storage system.

Referring now to FIG. 9b, accessor 810 retrieves portable data storage cartridge 840 from plurality of storage slots 870, moves from rail system 812 onto movable rail system 850 such that accessor 810 is adjacent movable media storage device 830, and deposits portable data storage cartridge 840 into movable media storage device 830. Referring now to FIG. 9c, accessor 810 has transferred portable data storage cartridges 840 and 842 into movable media storage device 830.

Figure 9D:
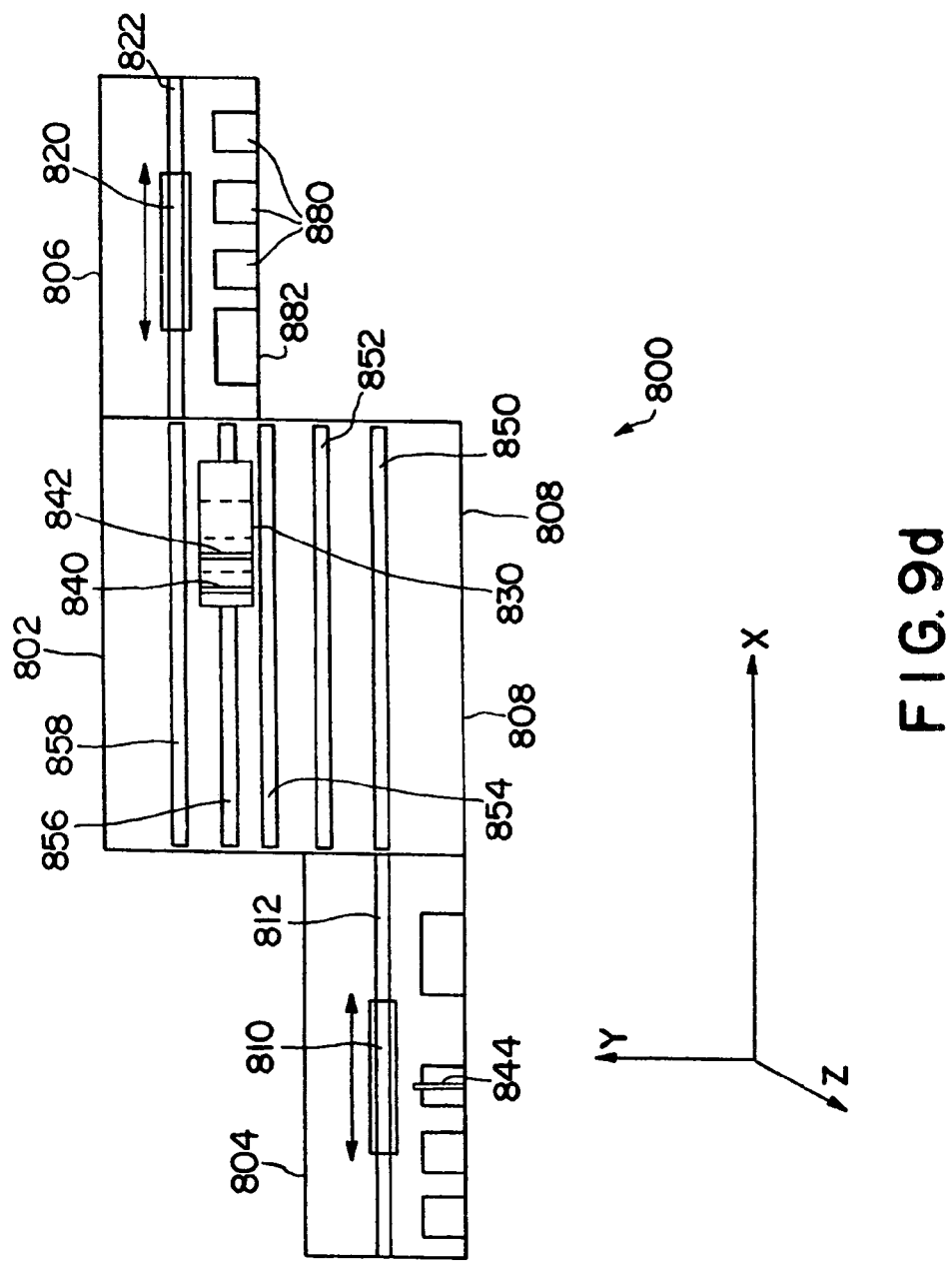
FIG. 9d shows a third step in Applicants' method to balance work load in an automated data storage system.

Referring now to FIG. 9d movable media storage device 830, including portable data storage cartridges 840 and 842, moves from movable rail system 852 to movable rail system 856. This is accomplished by: (i) moving movable rail system 850 in the −Y direction such that rail system 850 is adjacent wall 808 of garage 802, (ii) moving movable rail system 852 in the −Y direction such that rail system 852 is coaxial with rail system 812, (iii) moving movable media storage device 830 from rail system 852 onto rail system 812, (iv) moving movable rail systems 852 and 854 in the −Y direction toward side 808 of garage 802, (v) moving movable rail system 856 in the −Y direction such that rail system 856 is coaxial with rail system 812, and (vi) moving movable media storage device from rail system 812 onto rail system 856. Rail system 856 is then moved in the +Y direction such that rail system 856 is adjacent rail system 858.

Figure 9E:
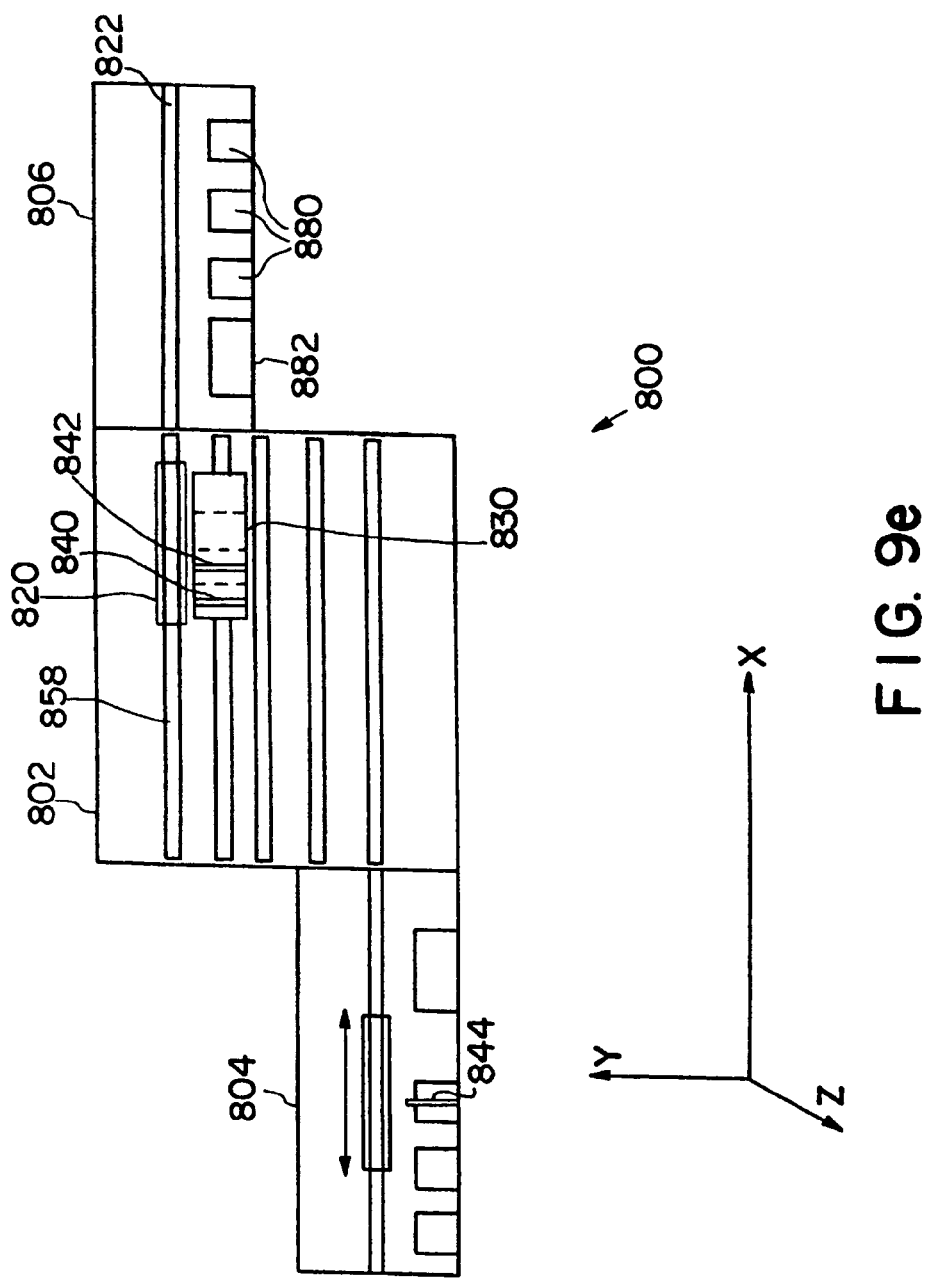
FIG. 9e shows a fourth step in Applicants' method to balance work load in an automated data storage system.
Figure 9F:
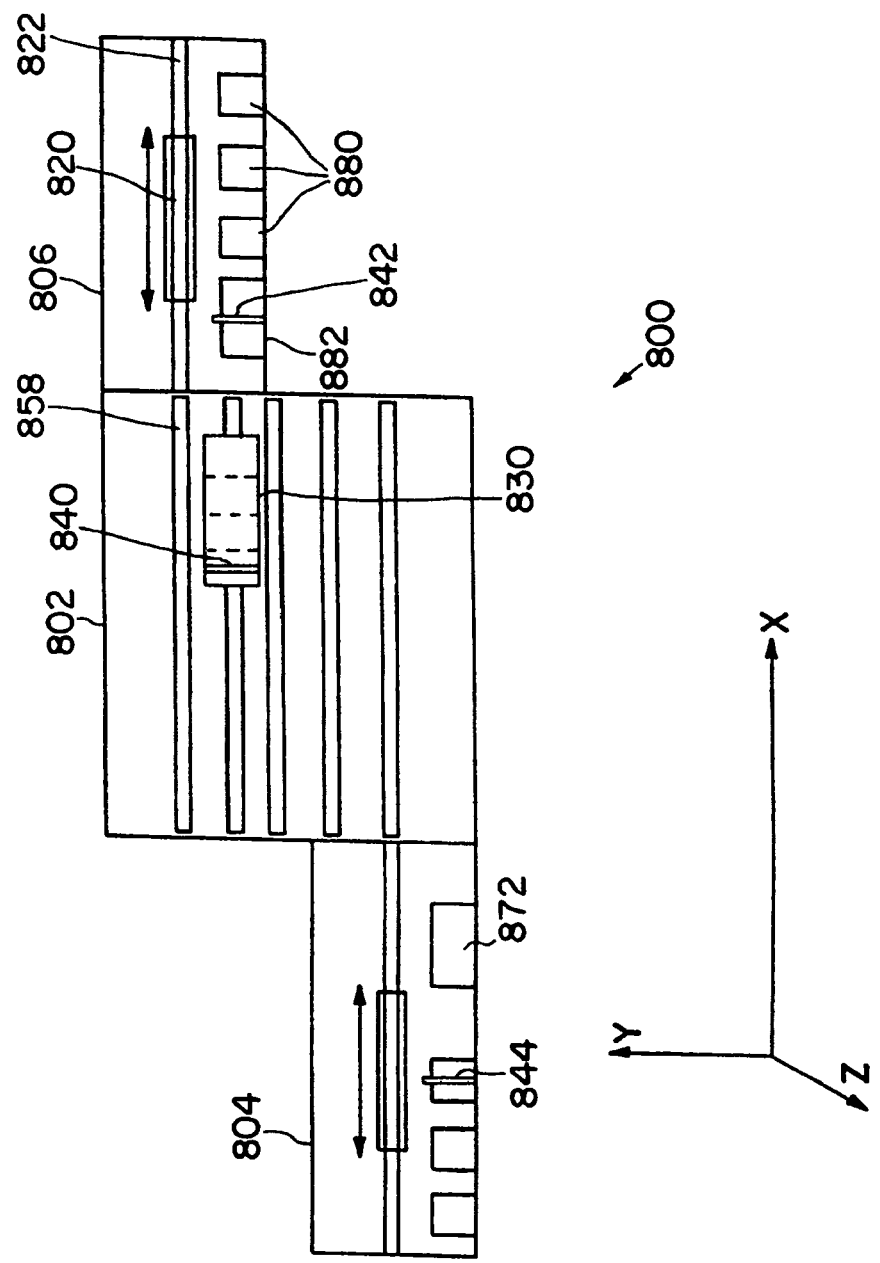
FIG. 9f shows a fifth step in Applicants' method to balance work load in an automated data storage system.
Figure 10:
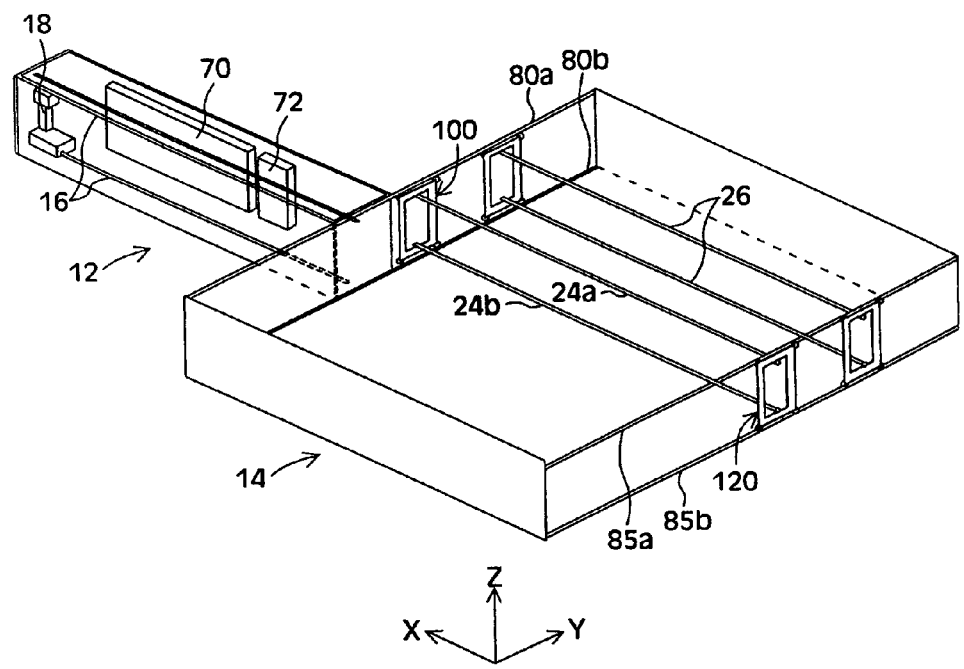
FIG. 10 illustrates an oblique view of the preferred embodiment.

Referring to FIG. 9e, accessor 820 moves from rail system 822 onto rail system 858 such that accessor 820 is adjacent movable media storage device 830. Referring to FIG. 9f, accessor 820 retrieves portable data storage cartridge 842 from portable media storage device 830, moves from rail system 858 onto rail system 822, and deposits portable data storage cartridge 842 into drive 882. As shown in FIG. 9f, portable data storage cartridge 844 remains in library 804 for use by drive 872. Portable data storage cartridge 840 is stored in movable media storage device 830 so that cartridge 840 can be used by drive 882. Portable data storage cartridge 842 is being used by drive 882.

Using the method described above, the storage location of portable data storage cartridges can be adjusted in order to balance the work load of a plurality of data drives in an automated data storage system. The example recited above involved only three portable data storage cartridges and two drive units. Applicants' method to balance work load in an automated data storage system includes embodiments wherein one or a plurality of portable data storage cartridges are placed into one or a plurality of movable media storage devices, and that one or a plurality of movable media storage devices are then moved to be in near proximity to one or a plurality of different drive units.

We claim:

1. An automated data storage system, comprising:
    a first media storage library having a first rail system comprising a set of rails disposed therein along a first axis;
    a garage disposed adjacent said first media storage library, said garage having a movable rail system disposed therein;
    one or a plurality of accessors, wherein said one or a plurality of accessors can be moved bidirectionally along said first rail system, and wherein each accessor comprises a running section, a vertical pillar extending outwardly from said running section, a lifting servo section which can be moved bidirectionally on said vertical pillar along a second axis, two robotic manipulators disposed on said lifting servo section, and a scanner disposed on said lifting servo section, wherein said second axis is perpendicular to said first axis;
    wherein said garage comprises:
    a second rail system comprising two parallel sets of rails, wherein each set of rails is disposed along a third axis, wherein that third axis is perpendicular to both said first axis and said second axis;
    a movable set of rails, wherin said movable set of rails can be moved bidirectionally along said second rail system to be substantially colinear with said first rail system such one or more accessors can be moved between said first rail system and said moveable rail system.

2. The automated data storage system of claim 1, wherein said first rail system further comprises a proximal end and a distal end, and wherein said movable rail system further comprises a first end and a second end, and wherein said first end can be positioned to be substantially colinear with said proximal end such that said one or plurality of accessors can move between said first rail system and said movable rail system.

3. The automated data storage system of claim 2, wherein said movable rail system further comprises a first positioning apparatus disposed on said first end and a second positioning apparatus disposed on said second end.

4. The automated data storage system of claim 1, wherein said movable rail system comprises two parallel rails.

5. The automated data storage system of claim 1, wherein said movable rail system comprises a plurality of paired parallel rails, wherein each of said plurality of paired parallel rails has a first end and a second end.

6. The automated data storage system of claim 5, wherein each of said pairs of parallel rails further comprises a first positioning apparatus disposed on its first end and a second positioning apparatus disposed on its second end.

7. The automated data storage system of claim 1, wherein said garage further comprises one or a plurality of doors.

8. The automated data storage system of claim 1, wherein said first rail system comprises two parallel rails.

9. The automated data storage system of claim 1, further comprising one or a plurality of movable media storage devices.

10. An automated data storage system, comprising:
a first media storage library having a first rail system comprising a set of rails disposed therein along a first axis;
a second media storage library having a second rail system comprising a set of rails disposed therein along said first axis;
one or a plurality of accessors, wherein each accessor comprises a running section, a vertical pillar extending outwardly from said running section, a lifting servo section which can be moved on said vertical pillar along a second axis, two robotic manipulators disposed on said lifting servo section, and a scanner disposed on said lifting servo section, wherein said second axis is perpendicular to said first axis;
a garage having a movable rail system disposed therein, wherein said garage is disposed adjacent said first media storage library and adjacent said second media storage library;
wherein said garage comprises:
a third rail system comprising two parallel sets of rails, wherein each set of parallel rails is disposed along a third axis, wherein said third axis is perpendicular to both said first axis and said second axis;
a movable sets of rails, wherein said movable set of rails can be moved bidirectionally along said third rail system to be substantially colinear with said first rail system such one or more accessors can be moved between said first rail system and said moveable rail system, and wherein said moveable set of rails can be moved bidirectionally alone said third rail system to be to be substantially colinear with said second rail system such one or more accessors can be moved between said second rail system and said moveable rail system.

11. The automated data storage system of claim 10, wherein said movable rail system can be positioned such that said one or a plurality of accessors can move between said first rail system and said movable rail system and between said second rail system and said movable rail system.

12. The automated data storage system of claim 10, wherein said movable rail system further comprises a first positioning apparatus disposed on said first end and a second positioning apparatus disposed on said second end.

13. The automated data storage system of claim 10, wherein said movable rail system comprises two parallel rails.

14. The automated data storage system of claim 10, wherein said movable rail system comprises a plurality of paired parallel rails, wherein each of said plurality of paired parallel rails has a first end and a second end.

15. The automated data storage system of claim 14, wherein each of said pairs of parallel rails further comprises a first positioning apparatus disposed on its first end and a second positioning apparatus disposed on its second end.

16. The automated data storage system of claim 10, wherein said garage further comprises one or a plurality of doors.

17. The automated data storage system of claim 10, wherein said first rail system and said second rail system each comprise two parallel rails.

18. The automated data storage system of claim 10, further comprising one or a plurality of movable media storage devices.

19. A method of moving one or a plurality of accessors within an automated data storage system, said method comprising the steps of:
providing a first media storage library having a first rail system comprising a set of rails disposed therein along a first axis;
providing a second media storage library having a second rail system comprising a set of rails disposed therein along said second axis;
providing one or a plurality of accessors, wherein said one or a plurality of accessors each comprise a running section, a vertical pillar extending outwardly from said running section, a lifting servo section which can be moved along a second axis on said vertical pillar, two robotic manipulators disposed on said lifting servo section, and a scanner disposed on said lifting servo section, wherein said second axis is perpendicular to said first axis;
providing a garage having a movable rail system disposed therein, wherein said gargare is disposed adjacent said first media storage library and adjacent said second media storage library, wherein said garage comprises:
a third rail system comprising two parallel set of rails, wherein each set of rails is disposed along a third axis, wherein said third axis is perpendicular to both said first axis and said second axis;
a plurality of movable sets of rails, wherein each movable set of rails can be moved bidirectionally along said third rail system;
movably disposing said one or a plurality of accessors on said first rail system;
positioning one of said moveable sets of rails to be substantially colinear with said first rail system;
moving said one or a plurality of accessors from said first rail system onto said movable set of rails;
positioning said movable set of rails to be substantially colinear with said second rail system;
moving said one or a plurality of accessors from said movable set of rails onto said second rail system.

20. The method of claim 19, further comprising the steps of:
positioning said movable rail system to be substantially colinear with both said first rail system and said second rail system; and
moving said one or a plurality of accessors from said first rail system onto said movable rail system and then from said movable rail system onto said second rail system.

21. The method of claim 20, wherein said movable rail system has a first end and a second end, and wherein said movable rail system further comprises a first positioning device disposed on said first end and a second positioning device on said second end.

22. The method of claim 20, wherein said movable rail system comprises a plurality of paired parallel rails, wherein each of said plurality of paired parallel rails has a first end and a second end; and wherein each of said pairs of parallel rails further comprises a first positioning apparatus disposed on the first end and a second positioning apparatus disposed on the second end.

* * * * *